Aug. 24, 1937. H. CHARMOY 2,090,747
ARMORED ELECTRICAL CABLE
Filed Oct. 3, 1935
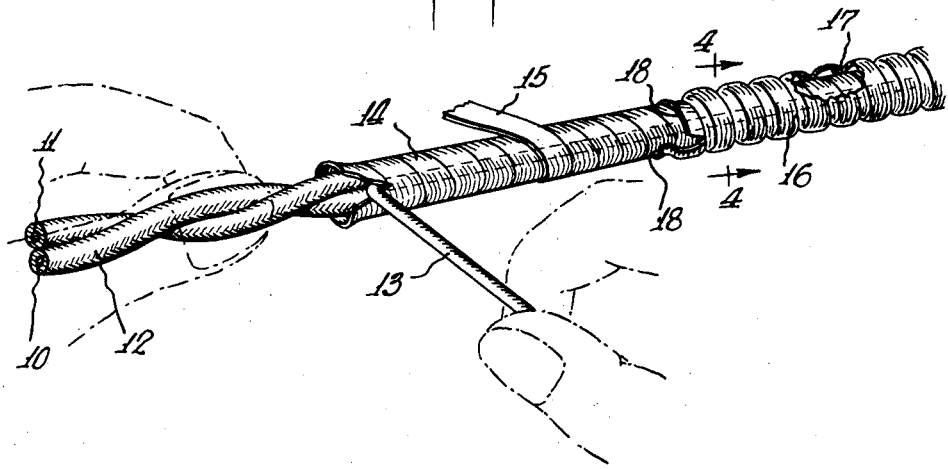
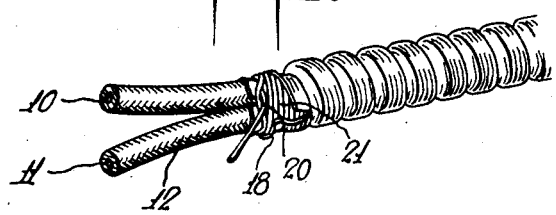
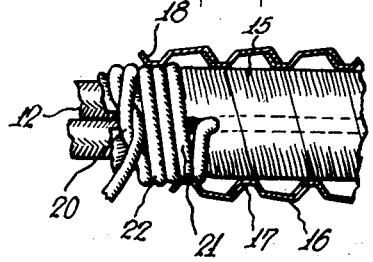
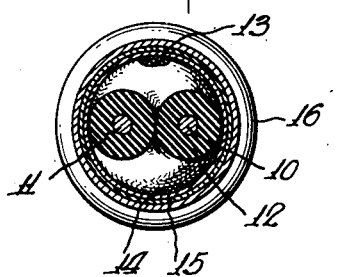
INVENTOR
*Harry Charmoy*
BY
*Dean, Fairbank, Hirsch & Foster.*
ATTORNEYS Patented Aug. 24, 1937

2,090,747

UNITED STATES PATENT OFFICE 2,090,747

ARMORED ELECTRICAL CABLE

Harry Charmoy, Long Island City, N. Y., assignor to Hillside Cable Co., Hillside, N. J., a corporation of New Jersey Application October 3, 1935, Serial No. 43,354

5 Claims. (Cl. 173—267)

My present invention is concerned with armored electric conductors or cables of the familiar type commonly used in the electric wiring of building constructions.

Among the objects of the invention are to provide an armored cable of the above type which may be produced at substantially the cost of conventional armored cable, and which is proof against the omission, the ineffective application or the loss of the separate pieces commonly applied to protect the insulation of the wire ends from being injured by a sharp cut edge of the armored sheath.

Another object is to provide an armored cable of the above type which lends itself to expeditious, almost instant removal of the insulating protective covering about the ends of conducting wires which protrude out of the metal armor or sheath, and this without resort to cutting tools apt to injure the insulation on the wires.

Another object is to provide an armored cable of the above type in which cushioning protection at the sharp cutting edges of the metal sheath or armor is built into the cable structure and is rendered effective without the need for any tools, yet without possibility of coming loose in operation.

A feature of the invention is the use of a packing, rather than a bushing, to protect the protruding insulated wire ends from being injured by the sharp cut edge of the metal sheath. This packing is a strip in the form of an insulating cord, braid or lace, to be wound and tied around the protruding ends of the conductors and to be packed in and lodged against the severed end of the metallic sheath.

Another feature is the embodiment of the packing strip lengthwise of the armored sheath as an auxiliary strand adjacent the insulated conductor or conductors, the exposed end of said strip, after severing of the armor sheath being wound and tied in the above manner.

Another feature is the incorporation of the strip of lace, cord, or braid, or the like, within the protective insulating cover, usually of paper, about the insulated conductors and within the armored sheath, the strip thus serving as a tear strip, longitudinally to sever the exposed end of the protective cover, preparatory to removal of the latter for exposing the conductor ends, whereupon the protruding end of tear cord is wound and tied in position to form the packing.

In the accompanying drawing, in which is shown one of various possible embodiments of the several features of the invention, Fig. 1 is a perspective view of the cable illustrating the process of preparing its end for installation, Fig. 2 is a perspective view similar to Fig. 1 indicating the construction at the cut end in installed condition, Fig. 3 is a fragmentary view on a larger scale and in longitudinal cross-section, showing the packing in position; and Fig. 4 is a view in transverse cross-section on a larger scale taken on line 4—4 of Fig. 1.

As conducive to a clear understanding of the invention, it is noted that the removal of the insulating paper covering from the insulated wire or wires at the region beyond the sawed-off end of the metal armor sheath, if done by hand, takes considerable time, while if resort is had to cutting tools, injury to the insulation wound on the enclosed wires is difficult to avoid. Moreover, the application of a split insulating bushing, in an effort to protect the insulated conductor ends from abrasion by the sharp cutting edge of the armored sheath is not always effective, because due to carelessness, such bushing might be omitted, or might be applied so loosely as to drop out, and in any event ordinary split bushings do not afford protection against cutting of the insulation at the region of the bushing split. By the present invention in its preferred and most specific embodiment, not only some, but all of these objections are overcome.

Referring now to the drawing, there is illustratively shown an armored cable, illustratively with two conductors 10 and 11 each covered by conventional insulation, illustratively braided covering 12. Extending the entire length of these conductors is a limber insulating strip 13 which may be a cord, a braid, a lace or the like of considerable tensile strength and of substantial width or thickness. The conductors 10 and 11 and the strip 13 are all enclosed in an insulating protective covering which may be of any desired form but which is preferably a continuous spirally wound paper strip 14 impregnated with wax, preferably with paraffin, the width of the paper being several times the pitch at which it is wound, thereby affording a multi-ply cover wound about the conductors and the strip 13. In the conventional process of fabricating the armored cable by winding the protective covering simultaneously with the armor sheath, the paraffin or other wax becomes sufficiently softened to afford an adequate bond of the various convolutions and to effect a secure continuous insulating enclosure.

In addition to the bonded protective cover there is preferably provided the further outer insulating covering layer 15 of paper devoid of wax or other adhesive, which is wound about the inner protective cover. About the parts thus far described, is wound the conventional metal sheath 16 comprising a strip of metal wound on a pitch substantially equal to its effective width, the overlapping helical edges being crimped together at 17.

To prepare the armored conductor for installation, the metal sheath is sawed off at the desired point, as at 18, in the usual or conventional manner. Thereupon, the tear strip 13, which is preferably dyed red to be readily distinguished from the conductors, is simply pulled outward and downward, thus acting as a tear strip, to slit the protective insulating covers 14 and 15 longitudinally into the V of the cut edge 18 of the metallic sheath.

The protruding end of tear strip 13 is now wound in a few turns 21 to fit as a packing within the cut end 18 of the sheath, and snugly about the paper sheathed conductors therein. Thereupon, the end of the tear strip 13 which protrudes beyond the packing turns 21 may be wound in one or more turns 22 about the paper sheaths and tied into a secure loop or knot as at 20. The exposed turn or turns 22 aside from the securing function, serve as a protective collar to prevent the sharp sawed edge of the armor from engaging and cutting the exposed ends of conductor insulation. After the packing strip has been tied at 20, the exposed insulating covers 14 and 15 may now be torn off, preferably to substantially the outer of the packing turns 22.

It will be understood that the packing turns 21 might be tightly tamped in place, and the excess length 22 of strip 13 cut off, or, if desired, the packing turns 21 might be eliminated, and the entire exposed length of strip 13 might be wound and tied around the paper sheathed conductor ends 10 and 11, as a protective collar. However, the specific arrangement best shown in Fig. 3 involving both the packing turns 21 and the wound and tied protective collar turns 22 is preferred.

In the device as shown, it will thus be seen that the wound and tied end of the strip 13 serves as a packing 21 and collar 22 rather than as a bushing and affords a complete and effective cushion to prevent any possible contact between the sharp cut edge 18 of the armored cable and the insulation 12 on the protruding conductor ends. Moreover, the packing 21 adequately insulates the sawed edge 18 of the armor with respect to the conductors, so that no grounding to the armor could possibly occur, even though the insulation 12 has been injured in the process of sawing the armor 16.

By the present invention, it is thus seen that the time consuming operation of severing the paper cover 14, 15 by hand preparatory to removal, is avoided, and also the temptation and danger as a time-saving expedient, of using a cutting tool for such purpose. The removal is practically the operation of an instant. Moreover, the mechanic need not carry a supply of insulating bushings, the application of which is apt to be forgotten, but the tear strip 13 being a unitary part of the cable construction, is simply packed and then tied in position as described, to afford truly effective protection, clear about the severed edge 18 of the cable armor.

It is, of course, understood that, if desired, the tear strip 13 might be used, solely as such, instead of also as a protective packing, a bushing or other auxiliary being in that case employed for the latter purpose.

It is understood that if desired the arrangement of protective packing at the cut end of the armored cable could be employed without using the feature of the tear strip.

It will thus be seen that there is herein described apparatus in which the several features of this invention are embodied, which in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

Having thus described my invention, what I claim as new and desire to secure by Letters Patent, is:

1. An armored electric conductor comprising an insulated wire, an insulating strip, a protective covering of insulating material surrounding the wire and the strip, a metallic sheath enclosing the protective covering and having a sharp cut end, the exposed end of said strip being wrapped around the protective covering and under the cut end of the sheath to protect the protruding insulated wire from being cut thereby.

2. An armored electric conductor comprising an insulated wire, an insulating strip, a protective covering of insulating material surrounding the wire and the strip, a metallic sheath enclosing the protective covering and having a sharp cut end, the exposed end of said strip being packed into said cut end of the sheath to protect the protruding insulated wire from being cut thereby.

3. An armored electric conductor comprising an insulated wire, an insulating strip, a protective covering of insulating material surrounding the wire and the strip, a metallic sheath enclosing the protective covering and having a sharp cut end, the exposed end of said strip being packed into and wrapped around the protective covering and under the cut end of the sheath to protect the protruding insulated wire from being cut thereby.

4. An armored electric conductor comprising one or more insulated wires, an insulating tear strip extending the length of said wires, a protective covering of paper or the like enclosing said wires and said tear strip, a metallic armor enclosing the protective covering and having a sharp edge cut at one or both ends, beyond which the insulated wires protrude, the end or ends of the tear strip being wound around and tied adjacent the sharp end or ends of the sheath, thereby to provide a soft packing to protect the insulation of the wires from being cut by the sharp end or ends of the metallic armor.

5. An armored electric conductor, comprising one or more insulated wires, an insulating tear strip extending the length of said wires, a protective covering of paper or the like enclosing said wires and said tear strip, a metallic armor enclosing the protective covering and having a sharp edge cut at one or both ends beyond which the insulated wires protrude, the end or ends of the tear strip being wound around and tied with respect to the protruding conductors to afford a packing protecting the insulation of the wires against being cut by the sharp ends of the armor.

HARRY CHARMOY.